US010259322B2

(12) United States Patent
Brandin

(10) Patent No.: US 10,259,322 B2
(45) Date of Patent: Apr. 16, 2019

(54) ROUNDABOUT DETECTING ARRANGEMENT

(71) Applicant: VOLVO CAR CORPORATION, Gothenburg (SE)

(72) Inventor: Magnus Brandin, Molnlycke (SE)

(73) Assignee: Volvo Car Corporation, Gothenburg (SE)

( * ) Notice: Subject to any disclaimer, the term of this patent is extended or adjusted under 35 U.S.C. 154(b) by 320 days.

(21) Appl. No.: 14/936,922

(22) Filed: Nov. 10, 2015

(65) Prior Publication Data
US 2016/0137060 A1   May 19, 2016

(30) Foreign Application Priority Data

Nov. 18, 2014 (EP) ..................................... 14193579

(51) Int. Cl.
*B60K 31/00* (2006.01)
*B60W 30/14* (2006.01)
*G06K 9/00* (2006.01)

(52) U.S. Cl.
CPC ...... *B60K 31/0008* (2013.01); *B60K 31/0066* (2013.01); *B60K 31/0083* (2013.01); *B60W 30/14* (2013.01); *B60W 30/143* (2013.01); *G06K 9/00791* (2013.01); *B60K 2031/0016* (2013.01); *B60K 2031/0025* (2013.01); *B60K 2031/0041* (2013.01); *B60K 2310/246* (2013.01); *B60W 2520/125* (2013.01); *B60W 2550/10* (2013.01); *B60W 2550/306* (2013.01)

(58) Field of Classification Search
CPC combination set(s) only.
See application file for complete search history.

(56) References Cited

U.S. PATENT DOCUMENTS

| 8,620,025 B2 | 12/2013 | Higuchi et al. |
| 9,665,781 B2 | 5/2017 | Hayakawa et al. |
| 2005/0004753 A1 | 1/2005 | Weiland et al. |

FOREIGN PATENT DOCUMENTS

| CN | 102132335 A | 7/2011 |
| CN | 103718214 A | 4/2014 |
| DE | 102005002719 | 8/2006 |
| DE | 102012213933 | 2/2014 |
| EP | 2741256 | 6/2014 |
| FR | 2997183 | 4/2014 |

(Continued)

OTHER PUBLICATIONS

Extended European Search Report for European Application No. 14193579.1, Completed by the European Patent Office, dated Jun. 12, 2015, 8 Pages.

(Continued)

*Primary Examiner* — Redhwan K Mawari
(74) *Attorney, Agent, or Firm* — Brooks Kushman P.C.

(57) ABSTRACT

A roundabout detecting arrangement is disclosed configured to detect presence of a roundabout ahead of a vehicle hosting the arrangement. The arrangement includes a preceding vehicle monitoring unit configured to monitor at least one of a lateral movement and a heading direction of a vehicle preceding the host vehicle, and further configured to generate a first signal representative thereof. The arrangement also includes a processing unit configured to detect presence of the roundabout by processing the first signal. The present disclosure also relates to an adaptive cruise control arrangement and a method of detecting the presence of a roundabout.

15 Claims, 2 Drawing Sheets

(56) References Cited

FOREIGN PATENT DOCUMENTS

| | | |
|---|---|---|
| GB | 2397398 | 3/2006 |
| WO | 2014133868 | 9/2014 |

OTHER PUBLICATIONS

The State Intellectual Property Office of People's Republic of China, First Office Action for corresponding Chinese Application No. 201510754035.9, dated Dec. 29, 2018.

ROUNDABOUT DETECTING ARRANGEMENT

CROSS-REFERENCE TO RELATED APPLICATIONS

This application claims foreign priority benefits under 35 U.S.C. § 119(a)-(d) to European Patent Application No. 14193579.1, filed Nov. 18, 2014, which is incorporated by reference in its entirety.

TECHNICAL FIELD

The present disclosure relates to a roundabout detecting arrangement. The present disclosure also relates to an adaptive cruise control arrangement and a method of detecting presence of a roundabout.

BACKGROUND

Electronic driving-aids, such as adaptive cruise control arrangements, have become increasingly present in today's cars. An adaptive cruise control arrangement is an arrangement that is configured to automatically adjust vehicle speed to maintain a proper distance from vehicles ahead. In many cases such arrangement makes use of sensor information from on-board sensors.

Driving in urban environments adds requirements on driving aids, such as adaptive cruise control arrangements, since urban driving environments often comprise various driving speeds of surrounding vehicles, a lot of intersections, traffic lights, etc. A conventional adaptive cruise control arrangement is usually configured to control host vehicle velocity based on a distance to a preceding vehicle and a velocity of the preceding vehicle. Such a conventional adaptive cruise control arrangement will not be able to control host vehicle velocity in a satisfactory manner when following a preceding vehicle driving in a roundabout. One reason is that such a conventional adaptive cruise control arrangement may lose track of the preceding vehicle when the preceding vehicle is in a roundabout, due to the relatively large lateral movement of the preceding vehicle when it drives in the roundabout. When it loses track of the preceding vehicle, it will not be able to regulate host vehicle velocity in a satisfactorily manner. Thereby, such a conventional adaptive cruise control arrangement will usually not be able to control host vehicle velocity in a pleasant and/or safe manner.

To summarize, it is an advantage if driving aids, such as adaptive cruise control arrangements, are provided with information constituting reliable interpretations of a driving environment.

The document GB 2397398 B relates to an adaptive cruise control device for a vehicle including a detector connected to various vehicle sensors for detecting a current potentially hazardous driving condition. Examples of potentially hazardous driving conditions as specified in GB 2397398 B are; use of a telephone, use of a navigation system, approaching a T junction or roundabout. It is specified in GB 2397398 B that the roundabout is detected by the vehicle's navigation system. Such a device is associated with a number of drawbacks. One such drawback is that it will be dependent upon updated map information and access to signals from a number of satellites.

In view of the above, there is a need for an improved roundabout detecting arrangement which overcome at least some of the above mentioned drawbacks.

SUMMARY

An object of the present disclosure is to provide an improved roundabout detecting arrangement.

According to an embodiment of the present disclosure, the object is achieved by a roundabout detecting arrangement configured to detect presence of a roundabout ahead of a host vehicle hosting the arrangement, the arrangement comprising a preceding vehicle monitoring unit configured to monitor at least one of a lateral movement and a heading direction of a preceding vehicle, preceding the host vehicle, and further configured to generate a first signal representative thereof, and a processing unit configured to detect presence of the roundabout by processing the first signal.

Since the processing unit is configured to detect presence of the roundabout by processing the first signal and the first signal is representative of at least one of monitored lateral movement and monitored heading direction of the preceding vehicle, a reliable detection of a roundabout ahead of the host vehicle is provided. Thus, an improved roundabout detecting arrangement is provided. As a result, the above mentioned object is achieved.

Optionally, the preceding vehicle monitoring unit is configured to monitor a heading direction of the preceding vehicle and configured to generate the first signal representative thereof, and where the processing unit is configured to detect presence of the roundabout by identifying a sequence of successive events comprising occurrence of at least two different heading directions of the preceding vehicle.

Thereby, an even more reliable detection of a roundabout is provided.

Optionally, the sequence of successive events comprises occurrence of:

a first heading direction which deviates more from a reference heading direction than a first predetermined deviation angle, followed by a second heading direction essentially coinciding with the reference heading direction.

Thereby, an even more reliable detection of a roundabout is provided.

Optionally, the preceding vehicle monitoring unit is configured to monitor lateral movement of the preceding vehicle and configured to generate the first signal representative thereof, and where the processing unit is configured to detect presence of the roundabout by identifying a sequence of successive events comprising occurrence of:

a lateral movement in a first direction exceeding a first lateral movement threshold value, followed by a lateral movement essentially coinciding with a reference lateral movement.

Thereby, an even more reliable detection of a roundabout is provided.

Optionally, the sequence of successive events further comprises occurrence of:

a lateral movement in a second direction exceeding a second lateral movement threshold value, where the second direction is opposite to the first direction.

Thereby, an even more reliable detection of a roundabout is provided. Also, due to these features, an improved ability to separate between a roundabout and a curve is provided.

Optionally, the preceding vehicle monitoring unit is configured to monitor lateral movement and heading direction of the preceding vehicle and configured to generate the first signal representative thereof, and where the processing unit is configured to detect presence of the roundabout by identifying a sequence of successive events comprising occurrence of:

a lateral movement in a first direction, followed by a lateral movement in the first direction exceeding a first lateral movement threshold value, and a first heading direction which deviates more from a reference heading direction than a first predetermined deviation angle, followed by a second heading direction essentially coinciding with the reference heading direction.

Thereby, an even more reliable detection of a roundabout is provided.

Optionally, the sequence of successive events further comprises occurrence of:

a third heading direction which deviates more from a reference heading direction than a second predetermined deviation angle, where the second predetermined deviation angle is in a direction opposite to the first predetermined deviation angle with respect to the reference heading direction.

Thereby, an even more reliable detection of a roundabout is provided.

Further embodiments herein aim to provide, an adaptive cruise control arrangement comprising a roundabout detecting arrangement according some embodiments.

Since the adaptive cruise control arrangement comprises a roundabout detecting arrangement according some embodiments, an adaptive cruise control arrangement is provided which can utilize the reliable detection of a roundabout of the roundabout detecting arrangement.

Optionally, the adaptive cruise control arrangement is arranged to suppress acceleration of the host vehicle in case the roundabout detecting arrangement detects presence of a roundabout.

Thereby, an adaptive cruise control arrangement is provided which may regulate velocity of the host vehicle such that it matches a driving situation in a more satisfactory and safe manner.

Optionally, the adaptive cruise control arrangement further comprises an acceleration monitoring unit configured to monitor lateral acceleration of the host vehicle, where the acceleration monitoring unit is further configured to evaluate the monitored host vehicle lateral acceleration and on the basis thereof determine whether the host vehicle is in a roundabout previously detected by the roundabout detecting arrangement, and where the adaptive cruise control arrangement is arranged to suppress the acceleration of the host vehicle as long as the acceleration monitoring unit determines that the host vehicle is in the roundabout.

Thereby, an adaptive cruise control arrangement is provided which may regulate velocity of the host vehicle such that it matches the driving situation in an even more satisfactory and safe manner.

Further embodiments herein aim to provide a method of detecting presence of a roundabout ahead of a host vehicle using a roundabout detecting arrangement hosted in the host vehicle, where the arrangement comprises a preceding vehicle monitoring unit and a processing unit, where the method comprises:

monitoring at least one of a lateral movement and a heading direction of a preceding vehicle, preceding the host vehicle, and generating a first signal representative thereof, using the preceding vehicle monitoring unit, and detecting presence of the roundabout by processing the first signal, using the processing unit.

Since the method comprises the step of detecting presence of the roundabout by processing the first signal and the generated first signal is representative of at least one of monitored lateral movement and monitored heading direction of the preceding vehicle, a reliable method of detecting a roundabout ahead of the host vehicle is provided. Thus, an improved method of detecting presence of a roundabout ahead of a host vehicle is provided.

Optionally, the method comprises:

monitoring a heading direction of the preceding vehicle, and generating the first signal representative thereof, using the preceding vehicle monitoring unit, and detecting presence of the roundabout by identifying a sequence of successive events comprising occurrence of at least two different heading directions of the preceding vehicle, using the processing unit.

Thereby, an even more reliable detection of presence of a roundabout is provided.

Optionally, the identifying of a sequence of successive events comprises identifying of occurrence of a first heading direction which deviates more from a reference heading direction than a first predetermined deviation angle, followed by a second heading direction essentially coinciding with the reference heading direction.

Thereby, an even more reliable detection of presence of a roundabout is provided.

Optionally, the method comprises:

monitoring lateral movement of the preceding vehicle, and generating the first signal representative thereof, using the preceding vehicle monitoring unit, and detecting presence of the roundabout by identifying a sequence of successive events comprising occurrence of a lateral movement in a first direction exceeding a first lateral movement threshold value, followed by a lateral movement essentially coinciding with a reference lateral movement, using the processing unit.

Thereby, an even more reliable detection of presence of a roundabout is provided.

Optionally, the identifying of a sequence of successive events comprises identifying of occurrence of a lateral movement in a second direction exceeding a second lateral movement threshold value, where the second direction is opposite to the first direction.

Thereby, an even more reliable detection of presence of a roundabout is provided.

Optionally, the method comprises:

monitoring lateral movement and heading direction of the preceding vehicle, and generating the first signal representative thereof, using the preceding vehicle monitoring unit, and detecting presence of the roundabout by identifying a sequence of successive events comprising occurrence of:

a lateral movement in a first direction, followed by a lateral movement in the first direction exceeding a first lateral movement threshold value, and a first heading direction which deviates more from a reference heading direction than a first predetermined deviation angle, followed by a second heading direction essentially coinciding with the reference heading direction, using the processing unit.

Thereby, an even more reliable detection of presence of a roundabout is provided.

Optionally, the identifying of a sequence of successive events comprises identifying of occurrence of a third heading direction which deviates more from a reference heading direction than a second predetermined deviation angle, where the second predetermined deviation angle is in a direction opposite to the first predetermined deviation angle with respect to the reference heading direction.

Thereby, an even more reliable detection of presence of a roundabout is provided.

Further features of, and advantages with, the present disclosure will become apparent when studying the appended claims and the following detailed description. Those skilled in the art will realize that the different features described may be combined to create embodiments other than those described in the following, without departing from the scope of the present disclosure, as defined by the appended claims.

BRIEF DESCRIPTION OF THE DRAWINGS

The present disclosure, including its particular features and advantages, will be readily understood from the following detailed description and the accompanying drawings, in which.

DETAILED DESCRIPTION

As required, detailed embodiments are disclosed herein. However, it is to be understood that the disclosed embodiments are merely exemplary and that various and alternative forms may be employed. The figures are not necessarily to scale. Some features may be exaggerated or minimized to show details of particular components. Therefore, specific structural and functional details disclosed herein are not to be interpreted as limiting, but merely as a representative basis for teaching one skilled in the art.

The embodiments herein will now be described more fully with reference to the accompanying drawings, in which embodiments are shown. Disclosed features of embodiments may be combined as readily understood by one of ordinary skill in the art. Like numbers refer to like elements throughout.

Well-known functions or constructions will not necessarily be described in detail for brevity and/or clarity.

Figure 1:
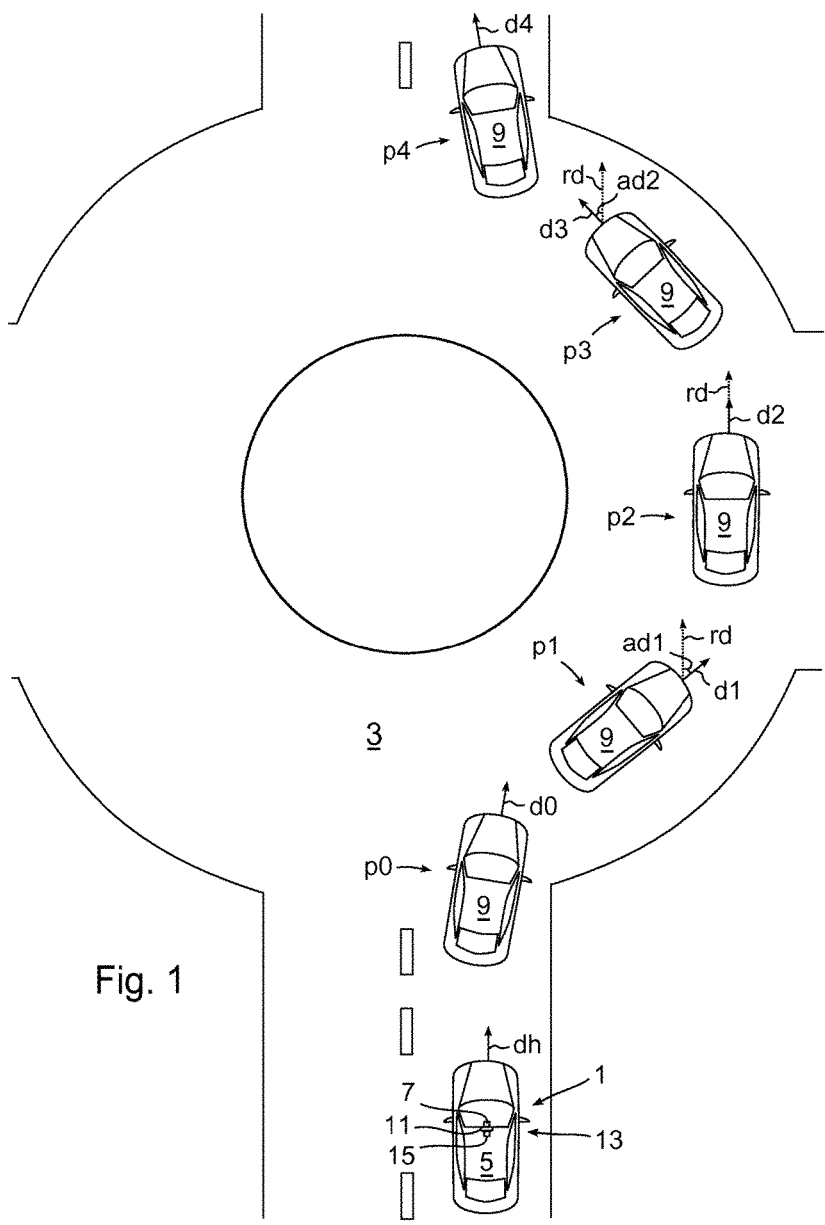
FIG. 1 illustrates a roundabout detecting arrangement configured to detect presence of a roundabout ahead of a host vehicle.

FIG. 1 illustrates a roundabout detecting arrangement 1 configured to detect presence of a roundabout 3 ahead of a host vehicle 5 hosting the arrangement 1. The arrangement 1 comprises a preceding vehicle monitoring unit 7 configured to monitor at least one of a lateral movement and a heading direction d0-d4 of a preceding vehicle 9, preceding the host vehicle 5. The preceding vehicle monitoring unit 7 is further configured to generate a first signal representative of at least one of monitored lateral movement and monitored heading direction d0-d4 of the preceding vehicle 9.

The arrangement 1 further comprises a processing unit 11 configured to detect presence of the roundabout 3 by processing the first signal. Thereby, a reliable detection of a roundabout 3 ahead of the host vehicle may be achieved. The processing unit 11 and/or any of the preceding vehicle monitoring unit 7, the velocity regulation unit, the acceleration monitoring unit 15 or any other unit described herein may comprise one or more processors, such as a microprocessor, microcontroller, programmable digital signal processor (DSP) or any other programmable device. Such units may also, or instead, include an application specific integrated circuit (ASIC), a programmable gate array or programmable array logic, a programmable logic device, or a digital signal processor (DSP). Where such a unit includes a programmable device such as a processor, microprocessor, microcontroller or programmable digital signal processor, the unit may further include a memory or storage for storing computer executable code for controlling operation of the programmable device and/or for performing any of the operations or functions described herein.

The preceding vehicle monitoring unit 7 may comprise one or more sensors such as RADAR (RAdio Detection And Ranging) sensors or LASER (Light Amplification by Stimulated Emission of Radiation) sensors, or LIDAR (LIght Detection And Ranging) sensors, or one or more imaging sensors, such as camera units, configured to monitor at least one of a lateral movement and a heading direction d0-d4 of a preceding vehicle 9, preceding the host vehicle 5.

The detection of a roundabout 3 ahead of the host vehicle 3 may be utilized by one or more driving safety systems and/or one or more driving aid systems, such as an adaptive cruise control arrangement. Conventional adaptive cruise control arrangements are usually configured to cancel control of vehicle speed and distance to a preceding vehicle when the preceding vehicle makes a turn to leave the road. Such conventional adaptive cruise control arrangements will thus also cancel control of vehicle speed and distance to a preceding vehicle when the preceding vehicle makes a turn into a roundabout. However, with the present roundabout detecting arrangement 1, an adaptive cruise control arrangement may utilize the findings of a roundabout 3 ahead of the host vehicle 5 to keep track of the preceding vehicle 9, that is, to keep control of vehicle speed and distance to the preceding vehicle 9 when a roundabout 3 ahead of the host vehicle 5 is detected. Thereby, an improved control of host vehicle velocity, as well as an improved control of a distance to a preceding vehicle 9 can be achieved. Some embodiments herein relate to such an adaptive cruise control arrangement 13 which is 1 illustrated in FIG. 1 and which will be further described below.

According to some embodiments, the preceding vehicle monitoring unit 7 is configured to monitor a heading direction d0-d4 of the preceding vehicle 9 and configured to generate the first signal representative thereof, and where the processing unit 11 is configured to detect presence of the roundabout 3 by identifying a sequence of successive events comprising occurrence of at least two different heading directions d0-d4 of the preceding vehicle 9.

According to some embodiments, the sequence of such successive events comprise occurrence of:

a first heading direction d1 which deviates more from a reference heading direction rd than a first predetermined deviation angle ad1, followed by a second heading direction d2 essentially coinciding with the reference heading direction rd.

As illustrated in FIG. 1, the reference heading direction rd may coincide with a heading direction dh of the host vehicle. Further, the reference heading direction rd may coincide with a main extension of a road prior to, and/or after, a roundabout 3. Such a main extension of a road may for example be retrieved from the preceding vehicle monitoring unit 7 or from a navigation system of the host vehicle 5.

The sequence of successive events may further comprise occurrence of:

a third heading direction d3 which deviates more from a reference heading direction rd than a second predetermined deviation angle ad2, where the second predetermined deviation angle ad2 is in a direction opposite to the first predetermined deviation angle ad1 with respect to the reference heading direction rd.

In such embodiments, an arrangement 1 is provided which will have an improved ability to detect a roundabout 3 ahead of the host vehicle 5, since the arrangement 1 will have an improved ability to separate between a road exit and a roundabout 3. That is, since the second predetermined deviation angle ad2 is in a direction opposite to the first predetermined deviation angle ad1 with respect to the reference heading direction rd, the preceding vehicle 9 has made a turn leading to a first heading direction d1 which deviates more from a reference heading direction rd than a first predetermined deviation angle ad1, followed by a second heading direction d2 essentially coinciding with the reference heading direction rd, and then, a third heading direction d3 opposite to the first heading direction d1 with respect to the reference heading direction rd.

Thus, the preceding vehicle 9 has been driving in a path consistent with the form of a roundabout 3.

In FIG. 1, with respect to the reference heading direction rd, the first predetermined deviation angle ad1 has the same size as the second predetermined deviation angle ad2, but in an opposite direction. As an alternative, the second predetermined deviation angle ad2 may be smaller than the first predetermined deviation angle ad1 with respect to the reference heading direction rd. In such embodiments, an arrangement 1 is provided with will achieve a quicker detection of a roundabout 3 ahead of a host vehicle 5.

In FIG. 1, the preceding vehicle 9 is illustrated in five different positions p0-p4. In an initial position p0, the preceding vehicle 9 initiates a turn into the roundabout 3. The initiation of a turn may be detected by the preceding vehicle monitoring unit 7 by identifying a heading direction d0 deviating from the reference heading direction rd and/or by detecting a lateral movement in a first direction. As illustrated in FIG. 1, the first direction corresponds to a direction to the right when viewed from the position of a driver of the host vehicle 5. However, in embodiments of the present disclosure intended for markets having left hand traffic, the first direction will correspond to a direction to the left when viewed from the position of a driver in the host vehicle 5.

In a first position p1, the preceding vehicle 9 has entered the roundabout 3. In the first position p1, the first heading direction d1 of the preceding vehicle deviates more from a reference heading direction rd than a first predetermined deviation angle ad1. This may be identified by the processing unit 11 by processing the first signal. As an alternative, or in combination, the processing unit 11 may be configured to identify occurrence of a lateral movement of the preceding vehicle 9 in a first direction, exceeding a first lateral movement threshold value, by processing the first signal. Such lateral movement of the preceding vehicle 9 may occur at a position similar to the first position p1 illustrated in FIG. 1.

In a second position p2, the preceding vehicle 9 has followed the curvature of the roundabout 3 and now has a second heading direction d2 essentially coinciding with the reference heading direction rd and thus also, in the embodiments shown in FIG. 1, essentially coinciding with the heading direction dh of the host vehicle.

The processing unit 11 may be configured to identify occurrence of the second heading direction d2, essentially coinciding with the reference heading direction rd, by processing the first signal. As an alternative, or in combination, the processing unit 11 may be configured to identify occurrence of a lateral movement, of the preceding vehicle 9, essentially coinciding with a reference lateral movement by processing the first signal. Such a lateral movement of the preceding vehicle 9 usually occur at a position similar to the second position p2 illustrated in FIG. 1.

By identifying occurrence of the second heading direction d2 essentially coinciding with the reference heading direction rd and/or identify occurrence of a lateral movement, of the preceding vehicle 9, essentially coinciding with a reference lateral movement, the roundabout detecting arrangement 1 is able to separate between presence of a roundabout and presence of an exit of the road. As a result, a roundabout detection arrangement 1 is provided having an improved ability to detect presence of a roundabout 3.

In a third position p3, the preceding vehicle 9 has continued to follow the curvature of the roundabout 3 and now has a third heading direction d3 deviating more from a reference heading direction rd than a second predetermined deviation angle ad2. This may be identified by the processing unit 11 by processing the first signal. As an alternative, or in combination, the processing unit 11 is configured to identify occurrence of a lateral movement, of the preceding vehicle, in a second direction exceeding a first lateral movement threshold value by processing the first signal. Such lateral movement of the preceding vehicle 9 usually occur at a position similar to the third position p3 illustrated in FIG. 1. As illustrated in FIG. 1, the second direction corresponds to a direction to the left when viewed from the position of a driver of the host vehicle 5. In embodiments of the present disclosure intended for markets having left hand traffic, the second direction would correspond to a direction to the right when viewed from the position of a driver in the host vehicle 5.

By identifying occurrence of third heading direction d3 deviating more from a reference heading direction rd than a second predetermined deviation angle ad2 and/or identify occurrence of a lateral movement, of the preceding vehicle, in a second direction exceeding a first lateral movement threshold value, the arrangement 1 will be able to separate between presence of a roundabout and presence of a S-shaped curve. As a result, a roundabout detection arrangement 1 is provided having an improved ability to detect presence of a roundabout 3.

In a fourth position p4, the preceding vehicle 9 has continued to follow the curvature of the roundabout 3 and is now about to exit the roundabout 3. Also this event can be detected by the arrangement 1 through monitoring at least one of the lateral movement and a heading direction d4 of the preceding vehicle 9. The exit of the roundabout 3 of the preceding vehicle 9 will be detected by the preceding vehicle monitoring unit 7 through identifying a heading direction d4 approaching the reference heading direction rd and/or by detecting a lateral movement in the first direction.

According to some embodiments, the preceding vehicle monitoring unit 7 is configured to monitor lateral movement of the preceding vehicle 9 and configured to generate the first signal representative thereof, and the processing unit 11 is configured to detect presence of the roundabout 3 through identifying a sequence of successive events comprising occurrence of:

a lateral movement in a first direction exceeding a first lateral movement threshold value, followed by a lateral movement essentially coinciding with a reference lateral movement.

According to some embodiments, the sequence of successive events further comprises occurrence of:

a lateral movement in a second direction exceeding a second lateral movement threshold value, where the second direction is opposite to the first direction.

According to some embodiments, the preceding vehicle monitoring unit 7 is configured to monitor lateral movement and heading direction d0-d4 of the preceding vehicle 9 and configured to generate the first signal representative thereof, and where the processing unit 11 is configured to detect presence of the roundabout 3 by identifying a sequence of successive events comprising occurrence of:

a lateral movement in a first direction, followed by a lateral movement in the first direction exceeding a first lateral movement threshold value, and a first heading direction d1 which deviates more from a reference heading direction rd than a first predetermined deviation angle ad1, followed by a second heading direction d2 essentially coinciding with the reference heading direction rd.

According to some embodiments, the sequence of successive events further comprises occurrence of:

a third heading direction d3 which deviates more from a reference heading direction rd than a second predetermined deviation angle ad2, where the second predetermined deviation angle ad2 is in a direction opposite to the first predetermined deviation angle ad1 with respect to the reference heading direction rd.

As mentioned above, some embodiments of the present disclosure relates to an adaptive cruise control arrangement 13 comprising a roundabout detecting arrangement 1 according to some embodiments. FIG. 1 illustrates such an adaptive cruise control arrangement 13. The adaptive cruise control arrangement 13 comprises a roundabout detecting arrangement 1 and an arrangement for determining a distance to a preceding vehicle 9. Such arrangement for determining a distance to a preceding vehicle 9 may comprise the preceding vehicle monitoring unit 7. The adaptive cruise control arrangement 13 further comprises a host vehicle velocity regulation unit arranged to regulate host vehicle velocity based upon the distance to a preceding vehicle 9 and a relative velocity between the preceding vehicle 9 and the host vehicle 5.

Thus, in a situation where a distance between the preceding vehicle and the host vehicle is increasing, the adaptive cruise control arrangement 13 will use the host vehicle velocity regulation unit for regulating host vehicle velocity to accelerate the host vehicle 5.

However, according to some embodiments, the adaptive cruise control arrangement 13 is arranged to suppress acceleration of the host vehicle 5 in case the roundabout detecting arrangement 1 detects presence of a roundabout 3. As a result, an adaptive cruise control arrangement 13 is provided which will regulate velocity of the host vehicle 5 such that it matches a driving situation in a more satisfactory and safe manner. The expression, suppress acceleration, is intended to encompass an applying of a lower acceleration of the host vehicle 5 or applying of no positive acceleration of the host vehicle 5. That is, in case the roundabout detecting arrangement 1 detects presence of a roundabout 3, the adaptive cruise control arrangement 13 may apply a lower acceleration to the host vehicle 5, than otherwise would be the case.

According to some embodiments the adaptive cruise control arrangement 13 further comprises an acceleration monitoring unit 15 configured to monitor lateral acceleration of the host vehicle 5, where the acceleration monitoring unit 15 is further configured to evaluate the monitored host vehicle lateral acceleration and on the basis thereof, determine whether the host vehicle 5 is in a roundabout 3 previously detected by the roundabout detecting arrangement 1. In such embodiments, the adaptive cruise control arrangement 13 is arranged to suppress acceleration of the host vehicle 5 as long as the acceleration monitoring unit 15 determines that the host vehicle 5 is in the roundabout 3.

The acceleration monitoring unit 15 may evaluate the host vehicle lateral acceleration in a manner, similar to the identifying of occurrence of lateral movement of the preceding vehicle by the processing unit, to determine whether the host vehicle 5 is in a roundabout 3 or not. That is, the acceleration monitoring unit 15 may for example be arranged to determine that the host vehicle 5 is in the roundabout 3 if it identifies a certain pattern of host vehicle lateral acceleration.

Figure 2:
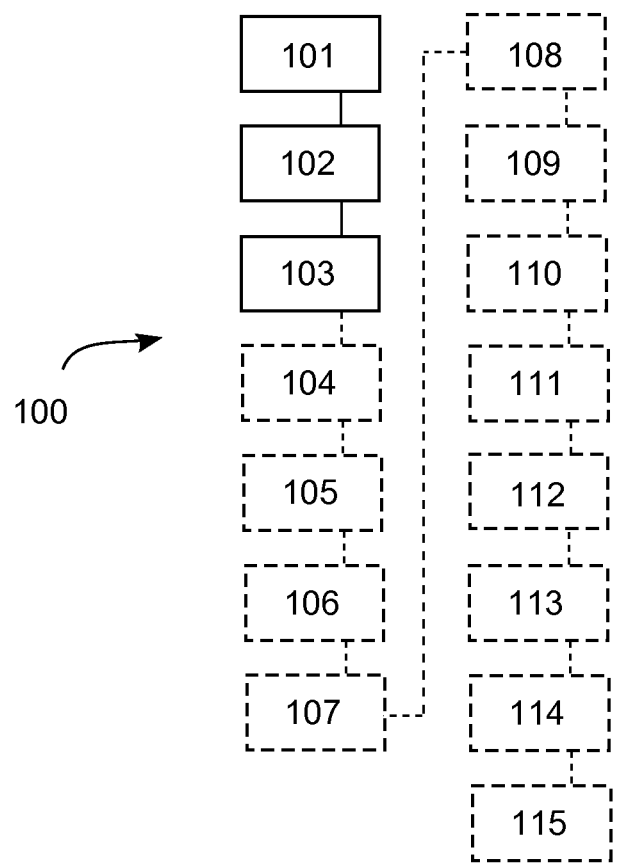
FIG. 2 illustrates a method of detecting presence of a roundabout ahead of a host vehicle.

FIG. 2 illustrates a method 100 of detecting presence of a roundabout ahead of a host vehicle using a roundabout detecting arrangement hosted in the host vehicle, where the arrangement comprises a preceding vehicle monitoring unit and a processing unit, where the method 100 comprises:

monitoring 101 at least one of a lateral movement and a heading direction of a preceding vehicle, preceding the host vehicle, and generating 102 a first signal representative thereof, using the preceding vehicle monitoring unit, and detecting 103 presence of the roundabout by processing the first signal, using the processing unit.

As illustrated in FIG. 2 the method 100 in some embodiments further comprises:

monitoring 104 a heading direction of the preceding vehicle, and generating 105 the first signal representative thereof, using the preceding vehicle monitoring unit, and detecting 106 presence of the roundabout by identifying 107 a sequence of successive events comprising occurrence of at least two different heading directions of the preceding vehicle, using the processing unit.

According to some embodiments, the identifying 107 of a sequence of successive events comprises identifying of occurrence of a first heading direction which deviates more from a reference heading direction than a first predetermined deviation angle, followed by a second heading direction essentially coinciding with the reference heading direction.

As illustrated in FIG. 2 the method 100 in some embodiments further comprises:

monitoring 108 lateral movement of the preceding vehicle, and generating 109 the first signal representative thereof, using the preceding vehicle monitoring unit, and detecting 110 presence of the roundabout by identifying 111 a sequence of successive events comprising occurrence of a lateral movement in a first direction exceeding a first lateral movement threshold value, followed by a lateral movement essentially coinciding with a reference lateral movement, using the processing unit.

According to some embodiments, the identifying 111 of a sequence of successive events comprises identifying of occurrence of a lateral movement in a second direction exceeding a second lateral movement threshold value, where the second direction is opposite to the first direction.

As illustrated in FIG. 2 the method 100 in some embodiments further comprises:

monitoring 112 lateral movement and heading direction of the preceding vehicle, and generating 113 the first signal representative thereof, using the preceding vehicle monitoring unit, and detecting 114 presence of the roundabout by identifying 115 a sequence of successive events comprising occurrence of:

a lateral movement in a first direction, followed by a lateral movement in the first direction exceeding a first lateral movement threshold value, and a first heading direction which deviates more from a reference heading direction than a first predetermined deviation angle, followed by a second heading direction essentially coinciding with the reference heading direction, using the processing unit.

According to some embodiments, the identifying 107, 115 of a sequence of successive events comprises identifying of occurrence of a third heading direction which deviates more from a reference heading direction than a second predetermined deviation angle, where the second predetermined deviation angle is in a direction opposite to the first predetermined deviation angle with respect to the reference heading direction.

The roundabout detecting arrangement 1, as well as the adaptive cruise control arrangement 13 comprising the roundabout detecting arrangement 1 and the method 100 of detecting presence of a roundabout ahead of a host vehicle 5, will as well as roundabouts, be able to detect presence of S-shaped curves having a curvature similar to a roundabout. This is due to the fact that the arrangements 1, 13 and method 100 provided uses monitored lateral movement and heading directions of a preceding vehicle 9 to detect a roundabout. Thus, in case of a curve, or a set of curves, having a curvature similar to a roundabout, the arrangements 1, 13 and method 100 provided will interpret such a curve, or a set of curves, as a roundabout. However, also in such cases, the arrangements 1, 13 and method 100 will still provide the corresponding advantages as is the case with a detection of a roundabout.

Also, the roundabout detecting arrangement 1, as well as the adaptive cruise control arrangement 13 comprising the roundabout detecting arrangement 1 and the method 100 of detecting presence of a roundabout ahead of a host vehicle 5, may as well as monitoring and/or identifying occurrence of a lateral movement and a heading direction d0-d4 of the preceding vehicle 9 and lateral acceleration of the host vehicle 5, monitor and/or detect presence of the derivative of, i.e. the rate of change of, or the integral of, any of these variables.

In FIG. 1, the host vehicle 5 is illustrated in a position ahead of the roundabout 3. However, the roundabout detecting arrangement 1, the adaptive cruise control arrangement 13, and the method 100 provided may as well detect presence of the roundabout 3 also when the host vehicle 5 is in the roundabout 3.

It is to be understood that the foregoing is illustrative of various example embodiments and the present disclosure is not to be limited to the specific embodiments disclosed and that modifications to the disclosed embodiments, combinations of features of disclosed embodiments as well as other embodiments are intended to be included within the scope of the appended claims.

While exemplary embodiments are described above, it is not intended that these embodiments describe all possible forms of the disclosure. Rather, the words used in the specification are words of description rather than limitation, and it is understood that various changes may be made without departing from the spirit and scope of the disclosure. Additionally, the features of various implementing embodiments may be combined to form further embodiments of the disclosure.

What is claimed is:

1. A roundabout detecting arrangement configured to detect a presence of a roundabout ahead of a host vehicle hosting the arrangement, the arrangement comprising:
    a preceding vehicle monitoring unit configured to monitor
        a movement characteristic of a preceding vehicle, preceding the host vehicle, and further configured to generate a first signal representative thereof; and
    a processing unit configured to detect the presence of the roundabout by processing the first signal, wherein detection of the presence of the roundabout is not dependent on map information.

2. The arrangement according to claim 1 wherein the movement characteristic comprises a heading direction of the preceding vehicle and wherein the preceding vehicle monitoring unit is configured to monitor a heading direction of the preceding vehicle and configured to generate the first signal representative thereof, and wherein the processing unit is configured to detect the presence of the roundabout by identifying a sequence of successive events comprising occurrence of at least two different heading directions of the preceding vehicle.

3. The arrangement according to claim 2 wherein the sequence of successive events comprises occurrence of:
    a first heading direction which deviates more from a reference heading direction than a first predetermined deviation angle, followed by
    a second heading direction essentially coinciding with the reference heading direction.

4. The arrangement according to claim 1 wherein the movement characteristic comprises lateral movement of the preceding vehicle and wherein the preceding vehicle monitoring unit is configured to monitor lateral movement of the preceding vehicle and configured to generate the first signal representative thereof, and wherein the processing unit is configured to detect the presence of the roundabout by identifying a sequence of successive events comprising occurrence of:
    a lateral movement in a first direction exceeding a first lateral movement threshold value, followed by
    a lateral movement essentially coinciding with a reference lateral movement.

5. The arrangement according to claim 4 wherein the sequence of successive events further comprises occurrence of:
    a lateral movement in a second direction exceeding a second lateral movement threshold value, where the second direction is opposite to the first direction.

6. The arrangement according to claim 1 wherein the movement characteristic comprises lateral movement and a heading direction of the preceding vehicle and wherein the preceding vehicle monitoring unit is configured to monitor lateral movement and heading direction of the preceding vehicle and configured to generate the first signal representative thereof, and wherein the processing unit is configured to detect presence of the roundabout by identifying a sequence of successive events comprising occurrence of:
    a lateral movement in a first direction, followed by
    a lateral movement in the first direction exceeding a first lateral movement threshold value, and a first heading direction which deviates more from a reference heading direction than a first predetermined deviation angle, followed by
    a second heading direction essentially coinciding with the reference heading direction.

7. The arrangement according to claim 3 wherein the sequence of successive events further comprises occurrence of:
    a third heading direction which deviates more from a reference heading direction than a second predetermined deviation angle, where the second predetermined deviation angle is in a direction opposite to the first predetermined deviation angle with respect to the reference heading direction.

8. An adaptive cruise control arrangement comprising:
a roundabout detecting arrangement configured to detect a presence of a roundabout ahead of a host vehicle hosting the arrangement, the arrangement including
a preceding vehicle monitoring unit configured to monitor at least one of a lateral movement and a heading direction of a preceding vehicle, preceding the host vehicle, and further configured to generate a first signal representative thereof, and
a processing unit configured to detect the presence of the roundabout by processing the first signal, wherein detection of the presence of the roundabout is not dependent on map information.

9. The adaptive cruise control arrangement according to claim 8 wherein the adaptive cruise control arrangement is arranged to suppress acceleration of the host vehicle in case the roundabout detecting arrangement detects the presence of a roundabout.

10. The adaptive cruise control arrangement according to claim 9 further comprising an acceleration monitoring unit configured to monitor lateral acceleration of the host vehicle, where the acceleration monitoring unit is further configured to evaluate the monitored host vehicle lateral acceleration and on the basis thereof determine whether the host vehicle is in a roundabout previously detected by the roundabout detecting arrangement, and where the adaptive cruise control arrangement is arranged to suppress the acceleration of the host vehicle as long as the acceleration monitoring unit determines that the host vehicle is in the roundabout.

11. A method of detecting a presence of a roundabout ahead of a host vehicle, the method comprising:
monitoring a movement characteristic of a preceding vehicle, preceding the host vehicle, using a roundabout detecting arrangement hosted in the host vehicle, the arrangement including a preceding vehicle monitoring unit and a processing unit;
generating, using the preceding vehicle monitoring unit, a first signal representative of the movement characteristic of the preceding vehicle monitored; and
detecting the presence of the roundabout by processing the first signal, using the processing unit, wherein detecting the presence of the roundabout is not dependent on map information.

12. The method according to claim 11 wherein the movement characteristic comprises a heading direction of the preceding vehicle, the method comprising:
monitoring a heading direction of the preceding vehicle;
generating the first signal representative of the monitored heading direction, using the preceding vehicle monitoring unit; and
detecting the presence of the roundabout by identifying a sequence of successive events comprising occurrence of at least two different heading directions of the preceding vehicle, using the processing unit.

13. The method according to claim 12 wherein identifying a sequence of successive events comprises identifying occurrence of a first heading direction which deviates more from a reference heading direction than a first predetermined deviation angle, followed by a second heading direction essentially coinciding with the reference heading direction.

14. The method according to claim 11 wherein the movement characteristic comprises lateral movement of the preceding vehicle, the method comprising:
monitoring lateral movement of the preceding vehicle;
generating the first signal representative of the monitored lateral movement, using the preceding vehicle monitoring unit; and
detecting the presence of the roundabout by identifying a sequence of successive events comprising occurrence of a lateral movement in a first direction exceeding a first lateral movement threshold value, followed by a lateral movement essentially coinciding with a reference lateral movement, using the processing unit.

15. The method according to claim 11 wherein the movement characteristic comprises lateral movement and heading direction of the preceding vehicle, the method comprising:
monitoring lateral movement and heading direction of the preceding vehicle;
generating the first signal representative of the monitored lateral movement and heading direction, using the preceding vehicle monitoring unit; and
detecting the presence of the roundabout by identifying a sequence of successive events comprising occurrence of
a lateral movement in a first direction, followed by
a lateral movement in the first direction exceeding a first lateral movement threshold value, and a first heading direction which deviates more from a reference heading direction than a first predetermined deviation angle, followed by
a second heading direction essentially coinciding with the reference heading direction, using the processing unit.

* * * * *

UNITED STATES PATENT AND TRADEMARK OFFICE
CERTIFICATE OF CORRECTION

PATENT NO. : 10,259,322 B2
APPLICATION NO. : 14/936922
DATED : April 16, 2019
INVENTOR(S) : Magnus Brandin It is certified that error appears in the above-identified patent and that said Letters Patent is hereby corrected as shown below:

In the Claims

Column 12, Lines 5-6, Claim 1:
After "the first signal"
Delete "wherein detection of the presence of the roundabout is not dependent on map information"
And Insert -- wherein the movement characteristic comprises a lateral movement or a heading direction of the preceding vehicle, wherein the preceding vehicle monitoring unit is configured to monitor lateral movement or heading direction of the preceding vehicle and generate the first signal representative thereof, and wherein the processing unit is configured to detect the presence of the roundabout by identifying a sequence of successive events comprising occurrence of:

a lateral movement in a first direction followed by a lateral movement in the first direction exceeding a first lateral movement threshold value, or a lateral movement in a first direction exceeding a first lateral movement threshold value followed by a lateral movement essentially coinciding with a reference lateral movement, or at least two different heading directions of the preceding vehicle. --.

Column 12, Lines 18-19, Claim 3:
After "sequence of successive events"
Insert -- further --.

Column 13, Line 15, Claim 8:
After "by processing the first signal"
Delete "wherein detection of the presence of the roundabout is not dependent on map information"
And Insert -- wherein the movement characteristic comprises a lateral movement or a heading direction of the preceding vehicle, wherein the preceding vehicle monitoring unit is configured to monitor lateral movement or heading direction of the preceding vehicle and generate the first signal representative thereof, and wherein the processing unit is configured to detect the presence of the roundabout by identifying a sequence of successive events comprising occurrence of:

a lateral movement in a first direction followed by a lateral movement in the first direction exceeding a first lateral movement threshold value, Signed and Sealed this
Eighteenth Day of June, 2019

Andrei Iancu
*Director of the United States Patent and Trademark Office*

CERTIFICATE OF CORRECTION (continued)
U.S. Pat. No. 10,259,322 B2 a lateral movement in a first direction exceeding a first lateral movement threshold value followed by a lateral movement essentially coinciding with a reference lateral movement, or
          at least two different heading directions of the preceding vehicle. --.

Column 13, Line 39, Claim 11:
After "and a processing unit"
Insert -- wherein the movement characteristic comprises a lateral movement or a heading direction of the preceding vehicle --.

Column 13, Line 44, Claim 11:
After "processing unit, wherein"
Delete "detecting the presence of the roundabout is not dependent on map information"
And Insert -- the presence of the roundabout is detected by identifying a sequence of successive events comprising occurrence of:
      a lateral movement in a first direction followed by a lateral movement in the first direction exceeding a first lateral movement threshold value, or
      a lateral movement in a first direction exceeding a first lateral movement threshold value followed by a lateral movement essentially coinciding with a reference lateral movement, or
          at least two different heading directions of the preceding vehicle. --.

Column 14, Line 10, Claim 13:
After "sequence of successive events"
Insert -- further --.